G. H. CURTISS.
FLYING BOAT HULL.
APPLICATION FILED OCT. 13, 1916.

1,329,336.

Patented Jan. 27, 1920.
2 SHEETS—SHEET 1.

Inventor
GLENN H. CURTISS.

By John P. Tarbox
Attorney

G. H. CURTISS.
FLYING BOAT HULL.
APPLICATION FILED OCT. 13, 1916.
1,329,336.
Patented Jan. 27, 1920.
3 SHEETS—SHEET 2.
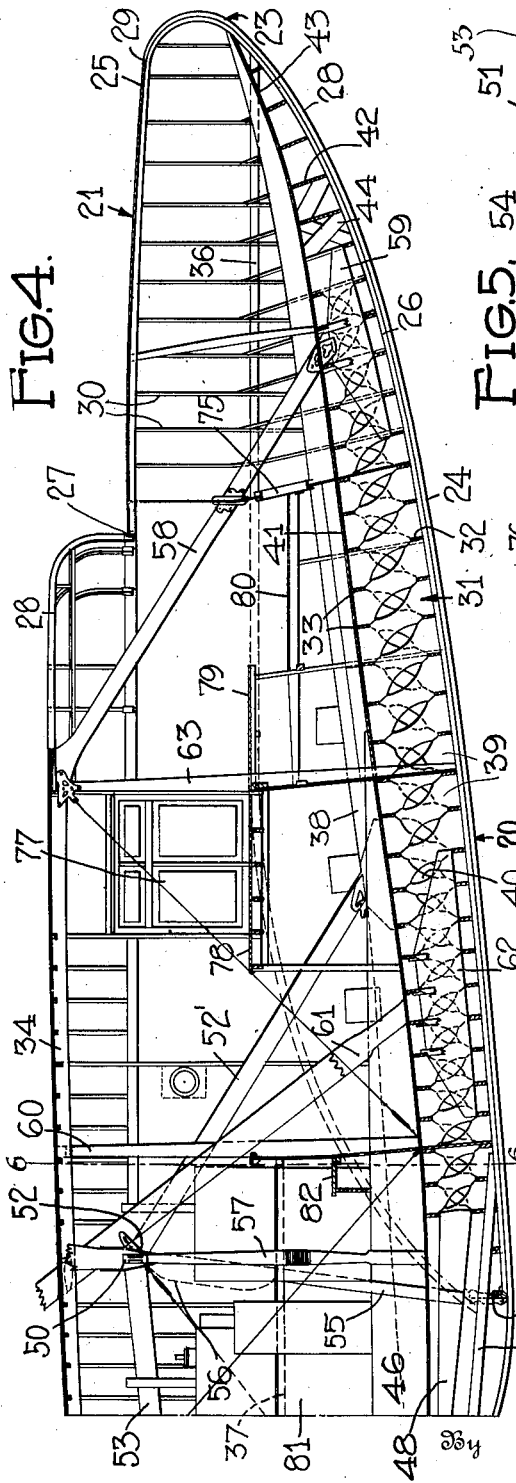
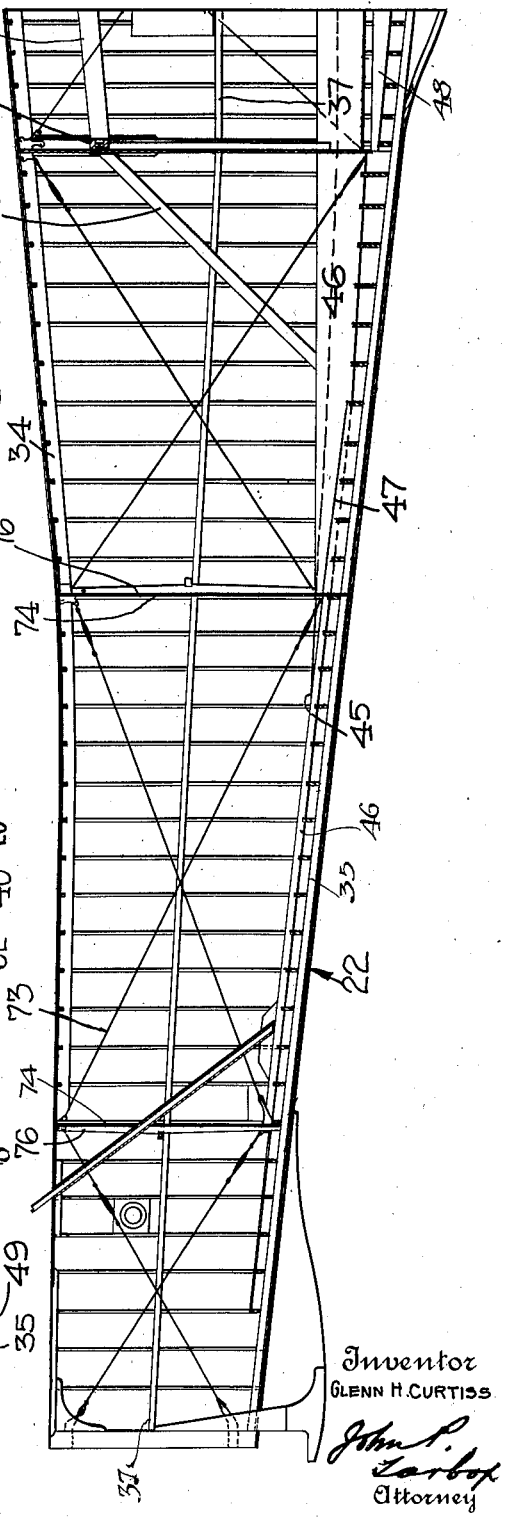
Inventor
GLENN H. CURTISS
Attorney

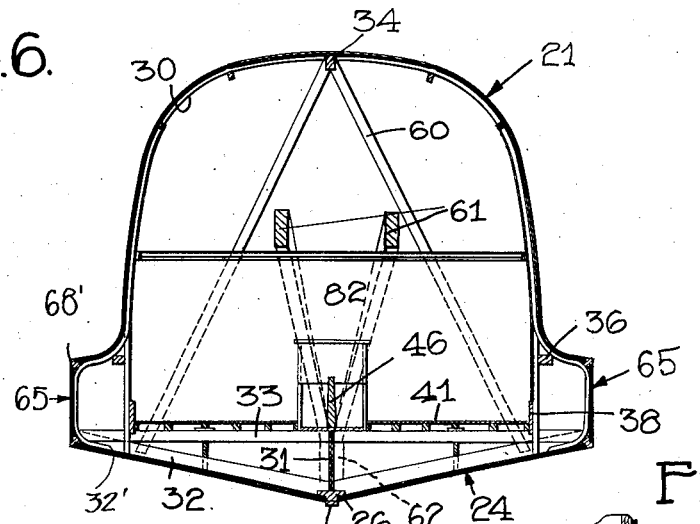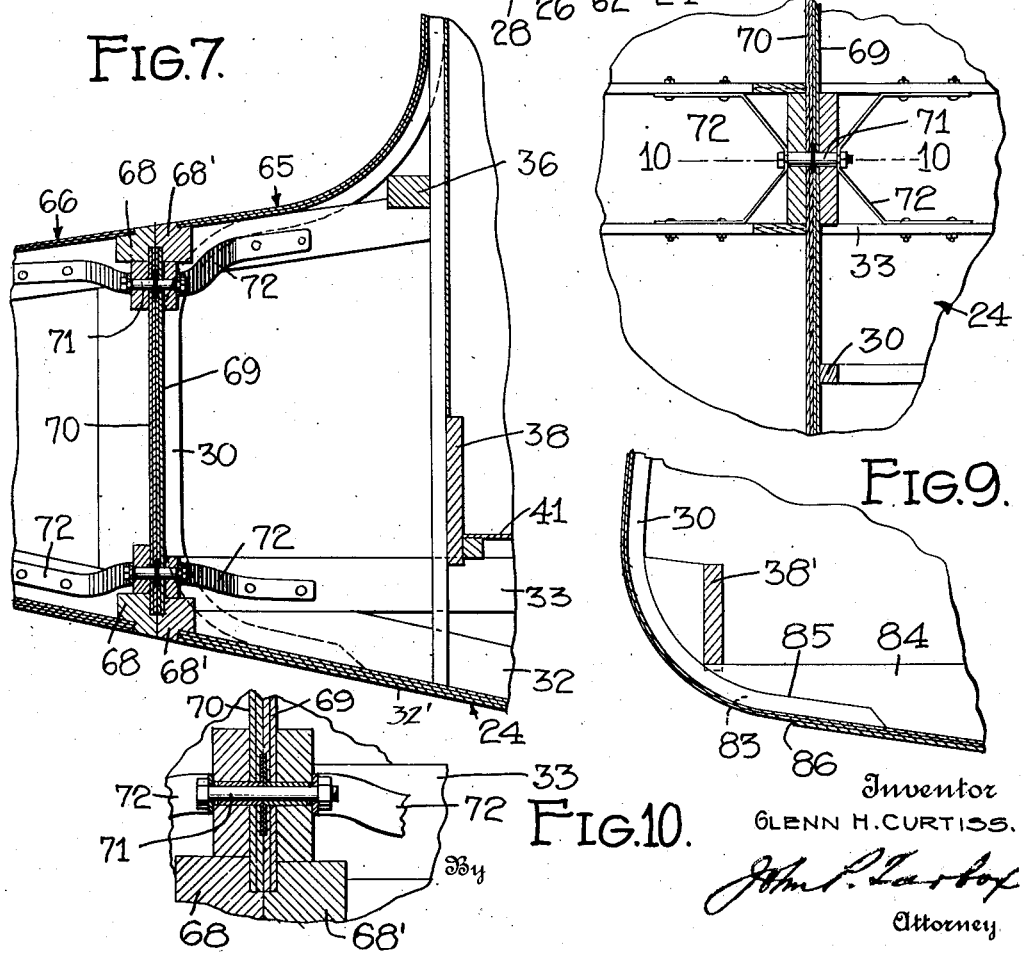

UNITED STATES PATENT OFFICE.

GLENN H. CURTISS, OF BUFFALO, NEW YORK, ASSIGNOR TO CURTISS AEROPLANE AND MOTOR CORPORATION, A CORPORATION OF NEW YORK.

FLYING-BOAT HULL.

1,329,336.　　　　　　Specification of Letters Patent.　　Patented Jan. 27, 1920.

Application filed October 13, 1916.  Serial No. 125,425.

*To all whom it may concern:*

Be it known that I, GLENN H. CURTISS, a citizen of the United States of America, residing at Buffalo, in the county of Erie and State of New York, have invented certain new and useful Improvements in Flying-Boat Hulls, of which the following is a specification.

My invention relates to hydroairplanes and flying boats and more particularly to improvements in flying boat hulls and hydroairplane flotation bodies.

In the construction of flying boat hulls, as distinguished from the pontoons or flotation bodies of hydroairplanes, it is customary to extend the airplane wings or supporting surfaces laterally out from the hull or from a point closely adjacent the hull rather than from a point distantly removed from the flotation body as in a hydroairplane. In the latter type of craft the flotation body serves merely as a means admitting of flight from and landing upon the surface of a body of water. In a flying boat the hull not only admits of such water operation but in addition it supplants the fuselage or nacelle of the hydroairplane and usually houses the occupants, fuel tank, control mechanism, etc. In both types of craft, however, various devices and means have been and are provided for adequately distributing and dissipating the hydroplaning stresses and flight stresses throughout such portion or portions of the craft as the flotation body, fuselage or wings. To this end, as well as to other improvements in the hull structure *per se*, the present invention is designed. The improved bracing system herein involved includes what I shall hereinafter designate a bridge type truss and an object of the invention is to so relate the improved truss to the hydroplaning bottom surface of the craft, the tail portion of the craft, the rearwardly facing step, and above all the airplane's wings, as to constitute certain of the structural elements of the latter a composite part of the truss. Preferably the hull comprises a fore body and a tail portion. The bottom of the fore body extends downwardly and rearwardly and the bottom of the tail portion extends upwardly and rearwardly; said portions being joined at the rearwardly facing step. The step, therefore, affords a line of demarcation between the fore body and the tail and is preferably located substantially directly beneath the airplane wings.

A further object of the invention is to provide for an increase in the hydroplaning area of the hull, and an increase in the hull displacement without a proportionate increase in the head resistance and without interrupting the streamlines of the hull. This I accomplish by lateral fin excrescencies arranged longitudinally of the chines ahead of the rearwardly facing step characteristic of the "Curtiss" hydroplanes. Each fin excrescency is made up of an integral and a non-integral part, the outside or non-integral part being detachable and independently buoyant or water-tight. Broadly speaking, the hull may be described as longitudinally divided to constitute separable connected water-tight sections each bearing a substantial portion of the total weight of the machine.

Other objects, advantages and improved results arising out of the particular wing-spar and tail structure I will hereinafter more particularly describe.

In the drawings, wherein like numerals of reference designate like or corresponding parts throughout the several views:

Fig. 4 is a detail longitudinal vertical sectional view of the fore part of the hull;

Fig. 5 is a similar view illustrating the interior structure of the extended tail;

Fig. 6 is a section on the line 6—6, Fig. 4;

Fig. 7 is a detail transverse section of one of the fin excrescencies;

Fig. 8 is a fragmentary longitudinal section of one of the fin excrescencies illustrating the fin fastening means;

Fig. 9 is a fragmentary transverse section of the tail portion of the hull;

Fig. 10 is a section on the line 10—10, Fig. 8, and

Figure 1:
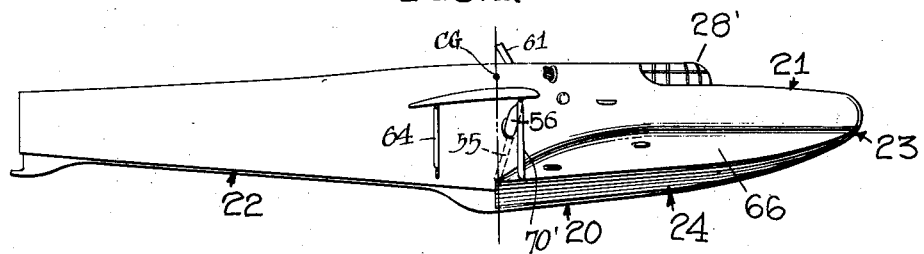
Figure 1 is a side elevation of a boat hull constructed in accordance herewith.
Figure 2:
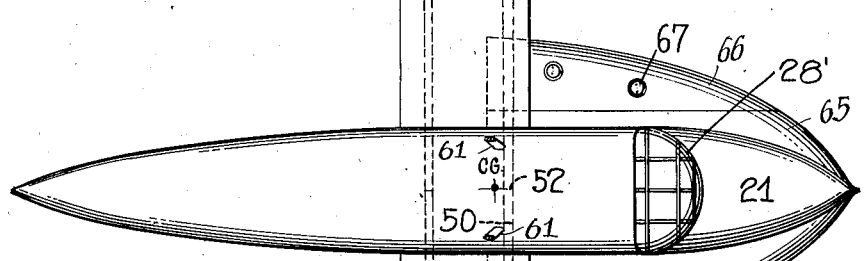
Fig. 2 is a top plan view.

In the embodiment of my invention selected for illustration, the hull proper, designated in its entirety by the numeral 20, may be generally described as comprising a fore body 21, of ample dimension abeam and abaft to afford appropriate cabin space for the flying crew, and a relatively elongated or extended tail portion 22, of a size appreciably augmenting the hull displacement and affording a support for the empennage (not shown).

The hull 20 from stem to stern is shaped to streamline form. The bow portion of the hull is rounded off rearwardly both vertically and laterally to present in side elevation a comparatively blunt overhanging nose herein designated 23, a hydroplaning under surface 24 forwardly merging into a scow-like bow, and a substantially horizontally flat fore deck 25, the deck 25, the scow-like bow, and the hull sides, at the forward end of the hull, merging into the nose 23 as illustrated advantageously in Fig. 4 whereby to continue the streamlines of the hull uninterruptedly and divergently aft. The keel of the boat, denoted 26, extends at its forward end on a curve upwardly and thence rearwardly horizontally beneath the deck 25 to a point 27 where the cabin top 28 interrupts the streamlines of the hull. In this way it reinforces the hydroplaning bottom 24, the nose 23, and the deck 25 at the bow end of the hull. It also makes for better streamlines, lessens manufacturing cost, and eliminates the use of a separate stem without structurally weakening the hull. The false keel 28 lies contiguous to the keel 26 from a point 29 at the forward end of the deck 25 throughout its rearward length.

Interiorly, the hull 20 is shaped to form through the medium of continuously curvilinear top-side frames 30, a keelson 31 (hereinafter more particularly disclosed), floors 32, floors 33, a compression piece 34, a tail keel 35, sponson hull-side-stringers 36, side stringers 37, and chine stringers 38. The keelson 31 is longitudinally laminated (the laminations being glued together) and transversely divided, the keelson sections, each designated 39, collectively constituting the respective laminations. As illustrated in Fig. 4, the several keelson sections lie edge-to edge and angularly or diagonally as regards a vertical line. The sections 39 which constitute one of said laminations extend diagonally oppositely to the sections constituting the other, the keelson 31 including but the two laminations thus constructed. To insure proper transverse ... sion of the keelson laminations, each keelson section may be described as having a vertical length at least equal to its length fore and aft. Lightning holes 40 are so formed in the laminations as to provide for a uniform distribution of water interiorly of the hull should the water enter therein at one side of the keelson only. The cross arrangement of the lightning holes will negative any weakening tendency which might otherwise result.

As intimated, different floors have been provided. The floors 32 are V-arranged and the floors 33 preferably straight. The floors 32 interconnect the keelson and the sponson stringers (later to be disclosed) and the floors 33 interconnect the terminals of the floors 32 to transversely brace the hull in the plane of the sponson stringers. The floors 33 also support the interior or cabin flooring 41. At the bow end of the hull floors 42 are provided. These floors supplant both series of floors i. e., the floors 32 and 33 and at the same time support a centrally located flooring strip 43. Diagonals 44 underlie the flooring strip 43. These diagonals may be described as forward continuations of the keelson.

The chine stringers 38 extend rearwardly from the nose end of the hull to a point well aft as indicated at 45 (Fig. 5). Interiorly of the hull and at that point where the greatest stresses and strains are imposed, I have provided an inside or hogging keelson 46. This hogging keelson at its forward end overlies the cabin flooring 41 throughout a portion of its length and at its rearward end continues aft beyond the rear end of the keelson 31. The hogging keelson 46, the keelson 31, the keel 26 and tail keel 35 collectively afford the backbone of the hull. The keelson 31 continues aft beyond the superposed floors 32 and 33 to extend for some little distance into the tail portion of the hull. This rearwardly extended portion of the keelson, however, is made in one piece.

When considered in its entirety, the hull bottom may be described as longitudinally convexed, the forward keel section 26 extending at one end aft beyond the point of maximum convexity and the rear keel section 35 continuing from said point of maximum convexity aft. That portion of the forward keel section 26 spacedly underlying the forward terminal of the keel section 35 adds somewhat to the hydroplaning area of the hull and at the same time allows for the formation of a rearwardly facing step 49 at the hull bottom aft beyond its point of maximum convexity in the vicinity of a line projected vertically through the center of gravity of the machine. Proper hydroplaning action or behavior can only be obtained in craft of this character by so locating the step.

Wing spars or beams designated respectively 50 and 51 extend transversely through the hull so as to project considerably beyond the hull sides at points well removed from the top or deck of the hull. Each spar is made up of spar sections jointed as indicated at 52 equidistant from the spar terminals to provide for assembly and removal by insertion and withdrawal respectively laterally through openings formed in the hull sides. The joint fitting will be hereinafter more particularly described.

To bridge the step 49 and interiorly brace the hull amidships, side braces 52' extend diagonally upwardly from the hull bottom at opposite sides of the keelson (preferably in the planes of the sides of the hull) and forwardly of the step to the forward wing spar 50. From the forward wing-spar the hydroplaning and landing stresses are transmitted rearwardly to the rear wing-spar 51 through the medium of compression members 53, and from the rear wing-spar downwardly and diagonally inwardly to the hogging keelson 46 at a point well aft of the step. Appropriate diagonal braces 54 are utilized to transmit the stresses and strains from the spar 51 to the hogging keelson 46. The step 49 is also braced directly to the forward wing-spar 50, the braces extending from the wing-spar without the hull, in downward converging relation, through the hull sides and into the hull interior for securement directly above the step. These struts or braces I have designated 55. That portion of each strut 55 extended without the hull is streamlined as indicated at 56. A center strut 57 interconnects the wing-spar 50 and the inside keelson 46 in a true vertical plane; engaging with the wing spar at the joint 52. The compression piece 34 may be also described, when considered in connection with a forward diagonal landing strut 58, as a bridge extending from a point well forward of the hydroplaning surface rearwardly into the tail portion of the hull. The hull outside frames 30 located aft of the forward end of the compression piece directly contact and intersect the said piece to receive and uniformly distribute the stresses and strains directed thereto. A front compression block 59, longitudinally divided and relatively elongated is arranged beneath the forward terminal of the landing gear strut 58 to contact with several of the bottom floors 32 as shown and to engage with the hull bottom symmetrically at opposite sides of the keelson. Inverted V-arranged struts 60 transmit the marginal stress directed against the under side of the hull to the compression piece 34, the mentioned struts contacting respectively the hull bottom adjacent the chine stringers 38 forwardly of the step and the compression piece 34. V-struts 61, mating interiorly of the hull, extend diagonally rearwardly from the keelson to and through the hull deck, preferably to the supports for the propelling power plants (not shown) of which there are two or more. An appropriate compression block 62 is located beneath the V-struts 61 to contact with several of the bottom floors. The forward end of the compression piece 34 is braced as indicated directly to the keelson 31 and in a true vertical plane by means of a center strut 63. Struts 64 extending diagonally outwardly contact at one end the sides of the hull and at their opposite ends the wing spars 50 and 51, the forward struts engaging at one end the outside top surface of the sponsons 65 which are made as an integral part of the hull. These sponsons continue the underneath hydroplaning surface laterally beyond the margins of the boat body proper. Each strut 64 is appropriately streamlined.

Fin excrescencies 66, longitudinally and transversely streamlined, continue the sponsons 65 laterally to an edge to constitute therewith fin excrescencies made up each of an integral and non-integral part. The non-integral part of each fin is made detachable and equipped with arm holes 67 that access may be gained to the interior thereof when it is desired that the fins be fastened or unfastened for removal. Fin side stringers 68 lie contiguous to the sponson stringers 68' of which (in each instance) there are two. This arrangement is preferred in order that the streamlines of the excrescencies may be as near perfect as possible throughout. Sponson side planking 69 interconnects the sponson stringers 68' and at the same time makes each sponson water-tight. Abutting fin side planking 70 interconnects the fin side stringers 68. The fins are also thus made water-tight. Moreover, struts 70' brace the fins diagonally to the forward wing-spar 50.

In constructing the fin excrescencies, the bottom floors 32 of the hull proper are extended laterally beyond the chines of the hull as illustrated in Fig. 6, the floors terminating at the sponson stringers 68' which they abut. The excrescencies are thus made an integral part of the hull. The bottom planking is also continuous or uninterrupted from the keel 26 to the margin of the fins. Where the fins are made as a unit or in one piece the bottom floors, and planking 32', continue uninterruptedly laterally to the fin edge stringers (not shown). The floors 33 also project or continue laterally beyond the chines of the hull to strengthen the fin excrescencies.

The fastening means for the opposed independently water-tight buoyant fin excrescencies in each instance is the same. Bolts 71 penetrate the abutting fin and sponson sides, access being gained to the inside terminal of each bolt 71 from the interior of the hull proper and to the outside terminal of each bolt via one or the other of the arm holes 67. Appropriate metallic strips 72 afford a tie means therefor, the metallic strips 72 at the outside terminal of each bolt contacting with the fin frames and at the inside terminal of each bolt with the hull frames. The strips 72 are fastened by any suitable means to the respective frames with which they engage. The fin excrescencies terminate abruptly rearwardly in lateral alinement with the step.

From end to end, the tail portion 22 of the hull 20 is held perfectly rigid and against distortion by means of cross arranged tie wires 73, the foremost of which extend forwardly into the fore body of the hull. Bulkheads 74, water-tight, divide the fore body of the hull into communicating compartments and the tail portion into non-communicating water-tight compartments, the bulkheads located aft affording anchorages for the tie wires 73. The foremost bulkhead is so located as to constitute the forward cabin wall. Access is gained to that portion of the hull forwardly of this foremost bulkhead through a man-hole 75 formed therein. The forward diagonal landing strut 58 also penetrates this forward bulkhead and affords a brace therefor. The rearward bulkheads are braced or made rigid by stiffeners 76.

For convenience, the cabin is equipped with lockers 77, an observation platform 78, a seat platform 79, and a foot control platform 80, each having its location in a horizontal plane above the flooring 41 supported by the floors 33. One of the bulkheads 74 is utilized as a support for the observation platform 78. Immediately aft of the cabin and in the approximate vertical plane of the center of gravity of the machine, tanks 81 for fuel and oil are located. It is essential that the variable load be located as near a line in the vertical plane of the center of gravity as is possible. Steps 82 lead from the tank room into the cabin.

In cross section, the bottom of the tail portion of the hull may be described as continuously curvilinear. To increase the rigidity and avoid the use of fittings heretofore required, the frames 30 of the tail are extended inwardly to underlie and complementally engage with the terminals of the floors whereat they are fastened as indicated at 83. The floors at the tail end of the hull have been designated 84. Each floor 84 is cut away terminally as indicated at 85 to complementally engage, as suggested, the curved terminal of its associated frame 30.

Not only is the tail structure thus distinguished over the prior art but in addition distinguished because of the fact that its curvilinear bottom in transverse section is interrupted longitudinally to provide a "breakwater edge." This breakwater edge may be formed in either of many ways although it is preferred that a longitudinal shoulder 86 be formed in the tail bottom adjacent each lateral margin. The "wash" or water is thus prevented from following the curvature of the tail, while hydroplaning, and the resistance to forward movement appreciably reduced.

Figure 11:
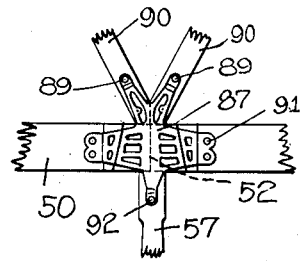
Figs. 11 and 12 are detail views of the wing spar fitting.
Figure 12:
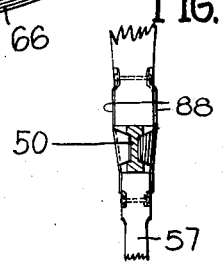
Figure 3:
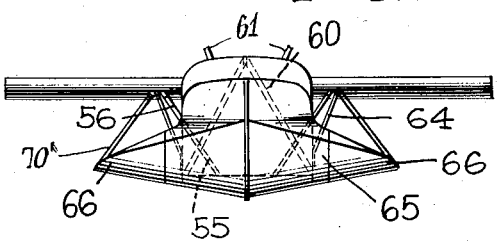
Fig. 3 is a front end elevation.

Upon reference to Figs. 11 and 12, it will be noted that a particular type of fitting is used at the joint 52. This fitting, designated as an entirety by the numeral 87, is made up of opposed sections 88, each comprising a plurality of radially arranged ears. The ears 89 engage with V-struts 90 which abut the forward wing-spar 50 at the joint 52, the ears 91 with the respective wing-spar sections and the ear 92 with the vertical strut 57. Such an arrangement affords in effect a clamp between which the several meeting elements are fastened and securely held.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. In a hull for flying boats, a hydroplaning bottom commencing at or near the bow end of the hull and terminating aft at a point distantly removed from the stern, a rearwardly facing step provided at the aft terminus of said bottom, and fins located at opposite sides of said bottom and directly opposite the resultant center of hydroplane lift to laterally augment the hydroplaning area thereof, a portion of each fin being detachable.

2. In a hull for flying boats, a hydroplaning bottom terminating aft at a point distantly removed from the bow end of the hull, a rearwardly facing step provided at the aft terminus of said bottom, sponsons arranged to extend the hydroplaning surface laterally beyond the sides of the hull proper, and fins located at opposite sides of the hull to augment the hydroplaning area thereof, each fin being water-tight in and of itself and so arranged relatively to the sponsons as to constitute lateral continuations thereof.

3. In a hull for flying boats, a hydroplaning bottom terminating aft at a point distantly removed from the bow end of the hull, a rearwardly facing step provided at the aft terminus of said bottom, sponsons arranged to extend the hydroplaning surface laterally beyond the sides of the hull proper, and fins formed in lateral continuation of said sponsons, each fin being detachable and having its bottom surface constructed in hydroplaning form.

4. In a hull for flying boats, a hydroplaning bottom commencing at a point at or near the bow end of the hull and terminating aft at a point distantly removed from the stern, a rearwardly facing step provided at the aft terminus of said bottom, and fins located at opposite sides of the hull and opposite the resultant center of hydroplane lift to augment the hydroplaning area thereof, each fin being detachable and water-tight in and of itself and of a length in a fore and aft direction sufficient to extend substantially the full length of the hydroplaning bottom.

5. In a hull for flying boats, a hydroplaning bottom terminating aft at a point distantly removed from the bow end of the hull, a rearwardly facing step provided at the aft terminus of said bottom, sponsons formed upon the hull sides in advance of said step as an integral part of the hull body, and fins attached respectively to the sponson sides, each fin being detachable and having its bottom surface constructed in hydroplaning form.

6. In a hull for flying boats, a hydroplaning bottom terminating aft at a point distantly removed from the bow end of the hull, a rearwardly facing step provided at the aft terminus of said bottom, sponsons formed upon the hull sides in advance of said step, the outer faces of the respective sponsons being relatively blunt, and fins having inner faces substantially complemental to the blunt faces of the sponsons, the fins being attached thereto and provided with relatively sharp outer edges.

7. In a hull for flying boats, an underneath hydroplaning surface, sponsons arranged to extend the hydroplaning surface laterally beyond the sides of the hull proper, fins arranged to continue the sponsons laterally, and fin fastening devices penetrating respectively the abutting fin and sponson sides.

8. In a hull for flying boats, an underneath hydroplaning surface, water-tight sponsons arranged to extend the hydroplaning surface laterally beyond the sides of the hull proper, detachable water-tight fins arranged to extend the sponsons laterally, and fin fastening devices penetrating the respective contiguous fin and sponson sides.

9. In a hull for flying boats, an underneath hydroplaning surface, sponsons arranged to extend the hydroplaning surface laterally beyond the sides of the hull proper, fins arranged to continue the sponsons laterally, fin fastening devices engaging respectively the abutting fin and sponson sides, and tie means for the fastening devices engaging respectively with the fin frames and the hull.

10. In a hull for flying boats, the combination of airplane wings including a wing beam forming a composite part of the hull, of a fore body having a downwardly and rearwardly inclined hydroplaning bottom surface extending throughout substantially its full length, a somewhat lighter tail portion having an upwardly and rearwardly inclined bottom surface extending throughout substantially its full length, the aft terminus of the forward hydroplaning bottom surface affording a line of demarcation between the fore body and the tail, said line of demarcation being situated substantially directly beneath said airplane wings, and a bridge type truss completely inclosed within the hull to bridge said line of demarcation and to extend well forward and well aft respectively into said body and said tail portion, the arrangement of the truss members with respect to the wing beam being such that the latter enters into and forms a composite part of the truss.

11. In a hull for flying boats, the combination with airplane wings including two wing beams forming a composite part of the hull, of a fore body having a downwardly and rearwardly inclined hydroplaning bottom surface extending throughout substantially its full length, a tail portion having an upwardly and rearwardly inclined bottom surface extending substantially throughout its full length, the aft terminus of the forward hydroplaning bottom surface affording a line of demarcation between the fore body and the tail, said line of demarcation being situated substantially directly beneath said airplane wings and intermediately of the wing beams forming a part thereof, and a bridge type truss completely inclosed within the hull to bridge said line of demarcation and to extend well forward and well aft respectively into said fore body and said tail portion, the arrangement of the truss members with respect to the wing beams being such that the latter enter into and form a composite part of the truss.

12. In a hull for flying boats, the combination with airplane wings including a wing beam forming a composite part of the hull, of a fore body having a downwardly and rearwardly inclined bottom surface extending throughout substantially its full length, the hydroplaning bottom surface at its rear end terminating in a rearwardly facing step, a tail portion having a bottom surface rearwardly and upwardly inclined from said step, the step affording a line of demarcation between the fore body and the tail, said line of demarcation being situated substantially directly beneath said airplane wings, and a bridge type truss completely inclosed within the hull to bridge the step and to extend well forward and well aft respectively into said fore body and said tail portion, the arrangement of the truss members with respect to the wing beam being such that the latter enters into and forms a composite part of the truss.

13. In a hull for flying boats, the combination with airplane wings including a forward wing beam and a rear wing beam, both of which form a composite part of the hull and both of which extend transversely through the hull at points intermediate of its ends and distantly removed from the top surface thereof, of a fore body having a downwardly and rearwardly inclined hydroplaning bottom surface extending throughout substantially its full length, said surface at its rear end terminating in a rearwardly facing step, a tail portion having a bottom surface upwardly and rearwardly inclined from the step, the step affording a line of demarcation between the fore body and the tail, said line of demarcation being situated substantially directly beneath said airplane wings and intermediately of the front and rear wing beams thereof, and a bridge type truss completely inclosed within the hull to bridge said step and to extend well forward and well aft respectively into said fore body and said tail portion, the arrangement of the truss members with respect to both wing beams being such that the latter enter into and form a composite part of the truss.

14. In a hull for flying boats, a keelson, chine stringers, wing spars extended through the hull and a means transmitting the hydroplaning stresses from the chine stringers forwardly of the hull to and through the wing spars and thence to the keelson aft of the rearmost spar.

15. In a hull for flying boats, the combination with airplane wings including a front wing beam and a rear wing beam forming a composite part of the hull, of a fore body having a hydroplaning bottom surface extended well forwardly of the airplane wings, a tail portion having a bottom surface extended well to the rear of the airplane wings, the aft terminus of the forward hydroplaning bottom surface affording a line of demarcation between the fore body and the tail, said line of demarcation being situated substantially directly beneath said airplane wings, and a bridge type truss completely inclosed within the hull to bridge said line of demarcation and to extend well forward and well aft respectively into said fore body and said tail portion, said truss comprising a member extended rearwardly and upwardly from the hydroplaning bottom surface to the forward wing beam, a second truss member extended rearwardly from the forward wing beam to the rear wing beam and a third truss member extended rearwardly and downwardly from the rear wing beam to the bottom of the tail portion.

16. In a hull for flying boats, chine stringers, built-in wing spars arranged to pass transversely through the hull, a rearwardly facing step located at the hull bottom in the vicinity of a line projected vertically through the center of gravity of the machine, and a means transmitting the hydroplaning stresses from the chine stringers to and through the forward wing-spar and from the wing-spar to the hull bottom in the vicinity of said step.

17. In a hull for flying boats, a keelson, chine stringers, wing spars extended through the hull, truss members extended rearwardly and upwardly from the chine stringers to the wing spars, and additional truss members extended rearwardly and downwardly from the wing spars for connection with the keelson.

18. In a hull for flying boats, built-in wing spars arranged to pass transversely through the hull below the deck thereof, a rearwardly facing step formed in the hull bottom substantially directly beneath the wing spars, a truss member extended rearwardly and upwardly from the hull bottom at a point forwardly of the step to the forward wing spar, a second truss member extended rearwardly from the forward wing spar to the rear wing spar, said second mentioned truss members being distantly removed from the deck of the hull, and a third wing truss member extended downwardly and rearwardly from the rear wing spar to the bottom of the hull, the truss members collectively constituting a bridge type truss changed to span the step.

In testimony whereof I affix my signature.

GLENN H. CURTISS